(12) United States Patent
Dry et al.

(10) Patent No.: US 10,000,821 B2
(45) Date of Patent: *Jun. 19, 2018

(54) DIRECT SMELTING PROCESS

(75) Inventors: Rodney James Dry, Western Australia (AU); Jacques Pilote, Western Australia (AU)

(73) Assignee: Tata Steel Limited, Mumbai (IN)

( * ) Notice: Subject to any disclaimer, the term of this patent is extended or adjusted under 35 U.S.C. 154(b) by 22 days.

This patent is subject to a terminal disclaimer.

(21) Appl. No.: 13/823,308

(22) PCT Filed: Sep. 15, 2011

(86) PCT No.: PCT/AU2011/001194
§ 371 (c)(1),
(2), (4) Date: Apr. 4, 2013

(87) PCT Pub. No.: WO2012/034184
PCT Pub. Date: Mar. 22, 2012

(65) Prior Publication Data
US 2013/0180361 A1 Jul. 18, 2013

(30) Foreign Application Priority Data

Sep. 15, 2010 (AU) .................. 2010904166

(51) Int. Cl.
| | |
|---|---|
| C21B 13/00 | (2006.01) |
| C21B 5/04 | (2006.01) |
| C21B 11/02 | (2006.01) |
| C21C 5/54 | (2006.01) |

(52) U.S. Cl.
CPC ............ *C21B 13/0006* (2013.01); *C21B 5/04* (2013.01); *C21B 11/02* (2013.01); *C21B 13/0013* (2013.01); *C21C 5/54* (2013.01); *Y02P 10/136* (2015.11); *Y02P 10/216* (2015.11)

(58) Field of Classification Search
CPC .................................................. C21B 13/0006
USPC ..................................................... 75/383, 414
See application file for complete search history.

(56) References Cited

U.S. PATENT DOCUMENTS

| | | | | |
|---|---|---|---|---|
| 2,865,734 | A | * | 12/1958 | Klemantaski ................... 75/453 |
| 3,522,356 | A | | 7/1970 | Olds |
| 3,765,868 | A | | 10/1973 | Moklebust |
| 3,850,615 | A | * | 11/1974 | Reeves ................. C21B 13/006 |
| | | | | 75/435 |

(Continued)

FOREIGN PATENT DOCUMENTS

| | | | |
|---|---|---|---|
| BR | 102013026712 A2 | * | 9/2014 |
| CN | 1308137 C | | 4/2007 |

(Continued)

OTHER PUBLICATIONS

Metallurgical Process principles, Metallurgical slag, Chapter IX, Chinese technical paper, dated Sep. 1973, with English Translation by Asia Technical Translation Pty Ltd.

(Continued)

*Primary Examiner* — Jenny R Wu
(74) *Attorney, Agent, or Firm* — Banner & Witcoff, Ltd.

(57) ABSTRACT

A molten bath-based direct smelting process includes controlling the process conditions in a direct smelting vessel so that molten slag in a molten bath of metal and slag in the vessel has a viscosity in a range of 0.5-5 poise in an operating temperature range for the process.

14 Claims, 2 Drawing Sheets

(56) References Cited

U.S. PATENT DOCUMENTS

| | | | | |
|---|---|---|---|---|
| 5,746,805 | A | * | 5/1998 | Queneau et al. .............. 75/446 |
| 6,379,422 | B1 | | 4/2002 | Dry |
| 6,423,115 | B1 | * | 7/2002 | McCarthy .............. C21B 11/00 75/414 |
| 6,428,603 | B1 | | 8/2002 | Batterham |
| 2002/0100345 | A1 | * | 8/2002 | Granati et al. ................ 75/401 |
| 2006/0278041 | A1 | * | 12/2006 | Harada .................... C10L 9/02 75/484 |

FOREIGN PATENT DOCUMENTS

| | | |
|---|---|---|
| EP | 1099746 A2 | 5/2001 |
| JP | 62227014 | 10/1987 |
| JP | 05239521 | 9/1993 |
| JP | 2001131620 | 5/2001 |
| JP | 20011518557 | 10/2001 |
| JP | 2003/105452 A | 4/2003 |
| JP | 2004131753 A | 4/2004 |
| JP | 2007177295 A | 7/2007 |
| NZ | 507157 A | 11/2001 |
| NZ | 516879 A | 8/2002 |
| RU | 2382089 | 5/2008 |
| RU | 2013116982 | 10/2014 |
| SU | 713919 A1 | 2/1980 |
| WO | 9916911 A1 | 4/1999 |
| WO | WO 2004065641 A1 * | 8/2004 |
| WO | WO 2005024074 A1 * | 3/2005 |
| WO | 2011000580 | 1/2011 |
| WO | 2011143703 A1 | 11/2011 |

OTHER PUBLICATIONS

Nafzifer, R. H. et al, "Prereduction and Melting of Domestic Titaniferous Materials", Metallurgical and Materials Transactions B—Process Metallurgy and Materials Processing Science, Spring New York LLC, United States, vol. 14B, No. 1, Mar. 1, 1983, pp. 55-62, XP009177384, ISSN: 0360-2141.

Mohanty J K et al, "Characterisation and utilisation magnetite of Boula-Nausahi igneous complex, Orissa, India", Scandanavian Journal of Metallurgy, Munksgaard, Copenhagen, DK, vol. 28 No. 6, Dec. 1, 1999, pp. 254-259, XP009177393, ISSN: 0371-0459.

* cited by examiner

Slag Tertiary System

Slag liquidus measurements on high $TiO_2$ slag

DIRECT SMELTING PROCESS

CROSS-REFERENCE TO RELATED APPLICATIONS

The present application is a U.S. National Phase filing of International Application No. PCT/AU2011/001194, filed on Sep. 15, 2011, designating the United States of America and claiming priority to Australian Patent Application No. 2010904166 filed Sep. 15, 2010. The present application claims priority to, and the benefit of, both the above-identified applications, which are incorporated by reference herein in their entireties.

The present invention relates to a process and an apparatus for smelting a metalliferous feed material.

The present invention relates particularly, although by no means exclusively, to a molten bath-based direct smelting process for producing molten metal (which term includes metal alloys) from a metalliferous feed material in a direct smelting vessel.

The present invention relates more particularly, although by no means exclusively, to a molten bath-based direct smelting process for producing molten metal from a metalliferous feed material in a direct smelting vessel that has a strong bath/slag fountain generated by gas evolution in the molten bath, with the gas evolution being at least partly the result of devolatilisation of carbonaceous material into the molten bath.

The metalliferous feed material may be any material that contains metal oxides. The metalliferous feed material may be ores, partly reduced ores, and metal-containing waste streams.

The present invention relates particularly, although by no means exclusively, to smelting iron-containing metalliferous feed material, such as iron ore titanium-bearing iron sand or titano-vanadium magnetite.

A known molten bath-based direct smelting process is generally referred to as the HIsmelt process, is described in a considerable number of patents and patent applications in the name of the applicant.

Another molten bath-based direct smelting process is referred to hereinafter as the "HIsarna" process. The Hisarna process and apparatus are described in International application PCT/AU99/00884 (WO 00/022176) in the name of the applicant.

The HIsmelt process is associated particularly with producing molten iron from iron ore.

In the context of producing molten iron, the HIsmelt process includes the steps of:

(a) forming a bath of molten iron and slag in a direct smelting vessel;

(b) injecting into the bath: (i) iron ore, typically in the form of fines; and (ii) a solid carbonaceous material, typically coal, which acts as a reductant of the iron ore feed material and a source of energy; and (c) smelting iron ore to iron in the bath.

The term "smelting" is herein understood to mean thermal processing wherein chemical reactions that reduce metal oxides take place to produce molten metal.

In the HIsmelt process solid feed materials in the form of metalliferous material and solid carbonaceous material are injected with a carrier gas into the molten bath through a number of lances which are inclined to the vertical so as to extend downwardly and inwardly through the side wall of the direct smelting vessel and into a lower region of the vessel so as to deliver at least part of the solid feed materials into the metal layer in the bottom of the vessel. The solid feed materials and the carrier gas penetrate the molten bath and cause molten metal and/or slag to be projected into a space above the surface of the bath and form a transition zone. A blast of oxygen-containing gas, typically oxygen-enriched air or pure oxygen, is injected into an upper region of the vessel through a downwardly extending lance to cause post-combustion of reaction gases released from the molten bath in the upper region of the vessel. In the transition zone there is a favourable mass of ascending and thereafter descending droplets or splashes or streams of molten metal and/or slag which provide an effective medium to transfer to the bath the thermal energy generated by post-combusting reaction gases above the bath.

Typically, in the case of producing molten iron, when oxygen-enriched air is used, it is fed at a temperature of the order of 1200° C. and is generated in hot blast stoves. If technically pure cold oxygen is used, it is typically fed at or close to ambient temperature.

Off-gases resulting from the post-combustion of reaction gases in the direct smelting vessel are taken away from the upper region of the vessel through an off-gas duct.

The direct smelting vessel includes refractory-lined sections in the lower hearth and water cooled panels in the side walls and the roof of the vessel, and water is circulated continuously through the panels in a continuous circuit.

The HIsmelt process enables large quantities of molten iron, typically at least 0.5 Mt/a, to be produced by direct smelting in a single compact vessel.

The HIsarna process is carried out in a smelting apparatus that includes (a) a smelting vessel that includes solids injection lances and oxygen-containing gas injection lances and is adapted to contain a bath of molten metal and (b) a smelt cyclone for pre-treating a metalliferous feed material that is positioned above and communicates with the smelting vessel.

The term "smelt cyclone" is understood herein to mean a vessel that typically defines a cylindrical chamber and is constructed so that feed materials supplied to the chamber move in a path around a vertical central axis of the chamber and can withstand high operating temperatures sufficient to at least partially smelt metalliferous feed materials.

In one form of the HIsarna process, carbonaceous feed material (typically coal) and flux (typically limestone) are injected into a molten bath in the smelting vessel. Metalliferous feed material, such as iron ore, is injected into and heated and partially melted and partially reduced in the smelt cyclone. This molten, partly reduced metalliferous material flows downwardly from the smelt cyclone into the molten bath in the smelting vessel and is smelted to molten metal in the bath. Hot, reaction gases (typically CO, $CO_2$, $H_2$, and $H_2O$) produced in the molten bath are partially combusted by oxygen-containing gas (typically technical-grade oxygen) in an upper part of the smelting vessel. Heat generated by the post-combustion is transferred to molten material in the upper section that falls back into the molten bath to maintain the temperature of the bath. The hot, partially-combusted reaction gases flow upwardly from the smelting vessel and enter the bottom of the smelt cyclone. Oxygen-containing gas (typically technical-grade oxygen) is injected into the smelt cyclone via tuyeres that are arranged in such a way as to generate a cyclonic swirl pattern in a horizontal plane, i.e. about a vertical central axis of the chamber of the smelt cyclone. This injection of oxygen-containing gas leads to further combustion of smelting vessel gases, resulting in very hot (cyclonic) flames. Finely divided incoming metalliferous feed material is injected pneumatically into these flames via tuyeres in the smelt cyclone, resulting in rapid heating and partial melting accompanied by partial reduction (roughly 10-20% reduction). The reduction is due to CO and $H_2$ in the reaction gases from the smelting vessel. The hot, partially melted metalliferous feed material is thrown outwards onto the walls of the smelt cyclone by cyclonic swirl action and, as described above, flows downwardly into the smelting vessel below for smelting in that vessel.

Process control in the HIsmelt process and the Hisarna process is an important issue. Each process requires highly agitated conditions in the molten bath and in the upper sections of the direct smelting vessel above the bath in order to achieve the required heat transfer and reaction conditions within the vessel and to minimise heat loss via the side walls and roof of the vessel. These reaction conditions include relatively oxidising conditions in the slag (compared to, for example, a blast furnace) and reducing conditions in the molten iron and heat transfer from the upper section of the vessel to the molten bath, particularly the molten iron in a lower section of the molten bath.

The above discussion is not intended to be an admission of the common general knowledge in Australia and elsewhere.

The present invention provides a molten bath-based direct smelting process that includes controlling the process conditions in a direct smelting vessel so that molten slag in a molten bath of metal and slag in the vessel has a viscosity in a range of 0.5-5 poise when the slag temperature is in an operating temperature range for the process.

The present invention provides a direct smelting process that includes supplying (a) a metalliferous material (b) a solid carbonaceous feed material, and (c) an oxygen-containing gas into a direct smelting vessel containing a molten bath of metal and slag and direct smelting the metalliferous feed material in the vessel and producing process outputs of molten metal, molten slag, and an off-gas, and the process being characterised by controlling the process conditions, as described herein, so that the molten slag has a viscosity in a range of 0.5-5 poise in an operating temperature range for the process.

The term "metalliferous material" is understood herein to include solid feed materials and molten feed material. The term also includes within its scope partially reduced metalliferous material.

The term "molten slag" is understood herein to mean slag that is completely liquid.

The term "molten slag" is understood herein to mean slag that includes a slurry of a solid material and a liquid phase.

The solid material in the molten slag may be a solid oxide phase at the slag temperature in the process, whereby the slag is a slurry of a solid oxide phase in a liquid slag phase.

The term "process conditions" is intended herein to have a wide meaning and to extend, by way of example, to (a) operating conditions within the direct smelting vessel, such as temperature and pressure and injection rates of the solid feed materials and the oxygen-containing gas into the vessel, (b) the composition of the molten bath, particularly the slag composition, and (c) the characteristics of the molten bath. The composition of the molten bath may include the selection of the constituents of the slag so that the slag is a molten slag, as described herein, in the operating temperature range of the process. As indicated in the definition of "molten slag" set out above, the molten slag may include a solid oxide phase and a liquid slag phase at the operating temperature range of the process. The characteristics of the molten slag include, by way of example, the viscosity and/or the oxygen potential of the molten slag mentioned above. The characteristics also include by way of example, the basicity of the molten slag and the turbulence of the slag. These characteristics are a function of operating conditions and slag composition.

The present invention is based on a realisation of the applicant, as a consequence of research and development work carried out by the applicant, that controlling slag viscosity in a range of 0.5-5 poise in an operating temperature range for the process of the invention provides an opportunity to control the process to produce molten metal more effectively.

The process may include controlling the process conditions by controlling the slag composition and the temperature of the molten bath to be below, typically slightly below, the liquidus temperature of the slag so that a solid oxide phase precipitates from a liquid phase of the molten slag, thereby controlling the viscosity of the slag. Actual point-to-point bath temperature can vary in the vessel due to a range of factors including slag stratification. For the purpose of slag viscosity evaluation, bath temperature is taken to be the temperature of liquid metal being discharged from the vessel when the process is running continuously.

The terms "viscosity" and "liquidus temperature" as used herein are understood to mean the viscosity and liquidus temperature as calculated by FactSage software (for liquidus temperature, "FactSage 6.1" or later and for viscosity "FactSage Viscosity 6.0" or later). Given the potential for non-standard results arising from different measuring and calculation techniques, rationalisation via FactSage calculation is defined to be implicit in the meaning of these terms. Such calculations, when executed, are to be fully consistent with guidelines for using the FactSage software and, if necessary, are to be reviewed and authorised by the owners of the FactSage software. In particular, calculations which (deliberately or otherwise) omit certain possible chemical species combinations will not be considered consistent with "viscosity" and "liquidus temperature" as used herein.

The process may include controlling the process conditions so that the solid material in the molten slag is at least 5% of the molten slag.

The solid material in the molten slag may be at least 10% of the molten slag.

The solid material in the molten slag may be less than 30% of the molten slag.

The solid material in the molten slag may be 15-25% of the molten slag.

The metalliferous feed material may be any material.

For example, the metalliferous feed material may be iron-containing material, such as iron ore.

When the metalliferous feed material is an iron-containing material, the process may include controlling the process conditions, as described herein, so that the molten slag has a viscosity in a range of 0.5-5 poise when the slag temperature is in a range of 1400-1550° C. in the direct smelting vessel.

When the metalliferous feed material is an iron-containing material, the process may include controlling the process conditions by controlling the ratio of the concentrations of iron in the slag to carbon in the metal to be less than 2:1, typically less than 1.5:1, more typically 1:1 to 1.3:1.

The process may include controlling the process conditions so that the molten slag has a high oxygen potential.

In the context of metalliferous feed material in the form of iron-containing material, the term "high" in the context of "oxygen potential" is understood herein to mean high in relation to blast furnace slag.

When the metalliferous feed material is iron-containing material, the process may include controlling the process conditions so that the FeO content of the molten slag is at least 3 wt. % so that the molten slag has a high oxygen potential.

The process may include controlling the process conditions so that the FeO content of the molten slag is at least 4 wt. % so that the molten slag has a high oxygen potential.

The process may include controlling the process conditions so that the FeO content of the molten slag is at least 5 wt. % so that the molten slag has a high oxygen potential.

The process may include controlling the process conditions so that the FeO content of the molten slag is less than 6 wt. %.

The process may include controlling the process conditions so that the FeO content of the molten slag is less than 10 wt. %.

When the metalliferous feed material is iron-containing material, the process may include controlling the process conditions so that the carbon content of the molten slag is at least 3 wt. %.

The process may include controlling the process conditions so that the carbon content of the molten slag is at least 4 wt. %.

The process may include controlling the process conditions so that the carbon content of the molten slag is less than 5 wt. %.

The process may include controlling the process conditions so that the viscosity of the molten slag is in the range of 0.5-4 poise.

The process may include controlling the process conditions so that the viscosity of the molten slag is in the range of 0.5-3 poise.

The process may include controlling the process conditions so that the viscosity of the molten slag is greater than 2.5 poise.

The process may include adding one or more than one additive to facilitate control of molten slag characteristics, for example slag composition and/or slag viscosity, in the molten bath.

By way of example, the additive may be selected to control basicity of the molten slag, for example by CaO addition, to decrease the viscosity of the slag and minimise the risk of a foamy slag.

The process may include operating the process above atmospheric pressure in the direct smelting vessel.

The oxygen-containing gas may be oxygen-enriched air or technical-grade oxygen.

The process may include supplying solid feed materials into the vessel by injecting metalliferous feed material and solid carbonaceous material and a carrier gas into the molten bath via solid material injection lances that extend downwardly and inwardly through a side wall of the vessel so that the solid feed materials at least partially penetrate a molten iron layer of the molten bath.

The process may include controlling the process, including controlling the injection of the solid feed materials and the carrier gas, to produce substantial agitation of the molten bath.

The extent of the agitation of the molten bath may be such that there is a substantially uniform temperature in the bath.

The process may include discharging the molten metal and the molten slag outputs of the process as separate process streams.

The process may be the HIsmelt process as described above.

The process may be the HIsarna process as described above.

The present invention is described in more detail hereinafter with reference to the accompanying drawings, of which:

Figure 1:
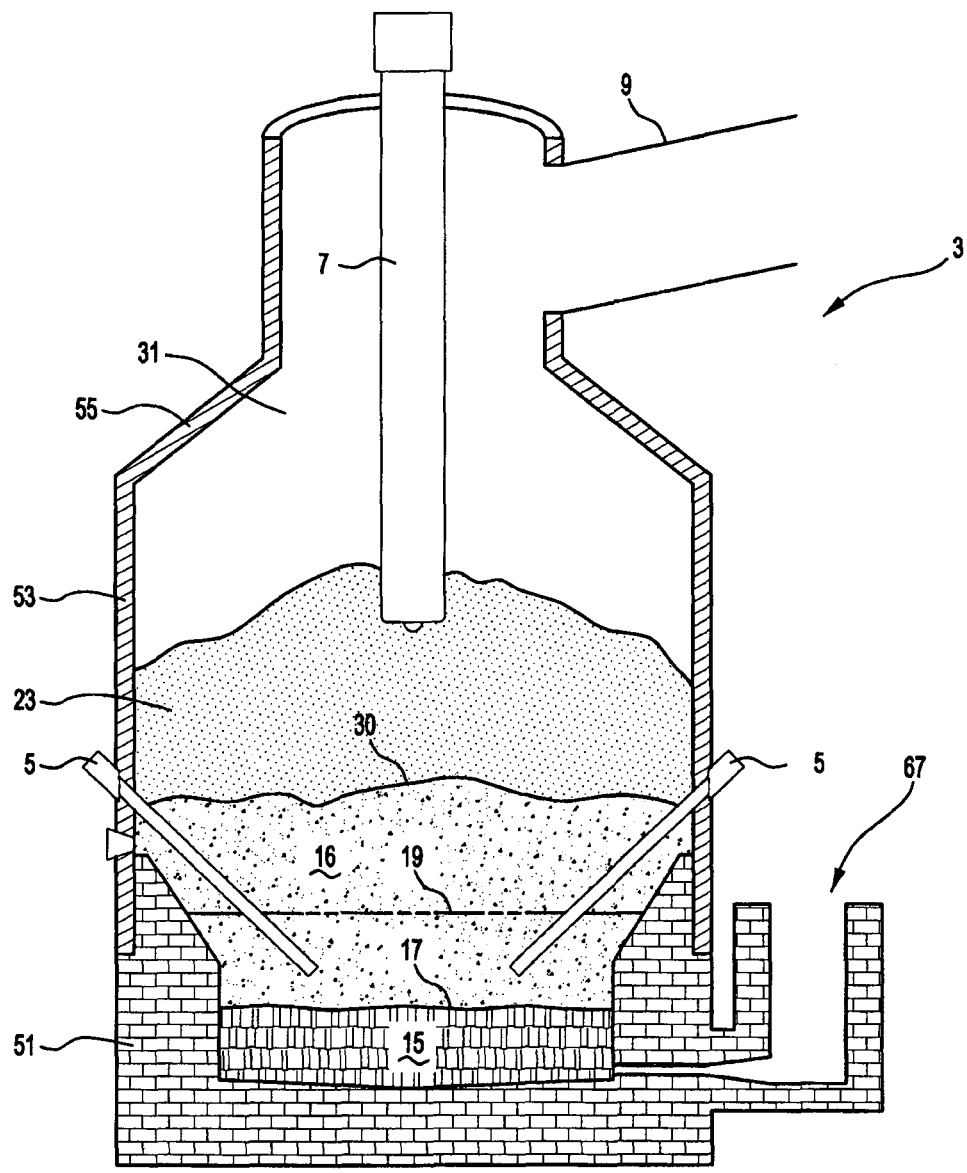
FIG. 1 is a diagrammatic view of a direct smelting vessel operating in accordance with one embodiment of a direct smelting process of the present invention.

The following description is in the context of smelting a metalliferous feed material in the form of a titanium/iron-containing ore, more specifically titanomagnetite, to produce molten iron via the HIsmelt process. The present invention is not limited to smelting titanomagnetite and extends to smelting any suitable metalliferous feed material. In addition, the present invention is not limited to the HIsmelt process and extends to any molten bath-based process that can generate the necessary process conditions. In particular, by way of example, the present invention extends to the HIsarna process as described above.

As is indicated above, the HIsmelt process is described in a considerable number of patents and patent applications in the name of the applicant. By way of example, the HIsmelt process is described in International application PCT/AU96/00197 in the name of the applicant. The disclosure in the patent specification lodged with the International application is incorporated herein by cross-reference.

The process is based on the use of a direct smelting vessel 3.

The vessel 3 is of the type described in detail in International applications PCT/AU2004/000472 and PCT/AU2004/000473 in the name of the applicant. The disclosure in the patent specifications lodged with these applications is incorporated herein by cross-reference.

The vessel 3 has a hearth 51 that includes a base and sides formed from refractory bricks, a side wall 53 which form a generally cylindrical barrel extending upwardly from the sides of the hearth and include an upper barrel section and a lower barrel section, a roof 55, an off-gas duct 9 in an upper section of the vessel 3, a forehearth 67 for discharging molten metal continuously from the vessel 3, and a tap hole (not shown) for discharging molten slag periodically from the vessel 3.

In use, the vessel contains a molten bath of iron and slag which includes a layer 15 of molten metal and a layer 16 of molten slag on the metal layer 15. The arrow marked by the numeral 17 indicates the position of the nominal quiescent surface of the metal layer 15 and the arrow marked by the numeral 19 indicates the position of nominal quiescent surface of the slag layer 16. The term "quiescent surface" is understood to mean the surface when there is no injection of gas and solid materials into the vessel. Typically, the temperature of the molten bath is in a range of 1400-1500° C.

The vessel 3 is fitted with a downwardly extending water-cooled hot air blast ("HAB") lance 7 extending into a top space of the vessel 3 and a plurality of water-cooled solids injection lances 5 extending downwardly and inwardly through a side wall and into the slag. The lances 5 extend downwardly and inwardly at an angle of 30-60° to the vertical through the side wall and into the slag layer 16 in the molten bath. The position of the lances 5 is selected so that the lower ends are above the quiescent surface 17 of the metal layer 15 of the molten bath.

In use, titanomagnetite and coal and slag additives entrained in a carrier gas (typically $N_2$) are directly injected into the bath via the solids injection lances 5.

The momentum of the injected solid materials/carrier gas causes the solid material and gas to penetrate the metal layer 15. The coal is devolatilised and thereby produces substantial volumes of gas in the metal layer 15. Carbon partially dissolves into the metal and partially remains as solid carbon. The iron oxides in the titanomagnetite are smelted to molten metal and the smelting reaction generates carbon monoxide gas. The gases transported into the metal layer 15 and generated via devolatilisation and smelting produce significant buoyancy uplift of molten metal, solid carbon, unreacted solid material in the titanomagnetite (predominantly $TiO_2$), and slag (drawn into the metal layer 15 as a consequence of solid/gas/injection) from the metal layer 15 which generates an upward movement of splashes, droplets and streams of molten metal and slag and entrained unreacted titanomagetite, and these splashes, and droplets, and streams entrain slag as they move through the slag layer 16.

The buoyancy uplift of the above-described material causes substantial agitation in the metal layer 15 and the slag layer 16, with the result that the slag layer 16 expands in volume and has a surface indicated by the arrow 30. The extent of agitation is such that there is reasonably uniform temperature in the metal and the slag regions—typically, 1400-1550° C. with a temperature variation of the order of 30° in each region.

In addition, the upward movement of the above-described material extends into a top space 31 of the vessel 3 that is above the molten bath in the vessel and:

(a) forms a transition zone 23; and
(b) projects some molten material (predominantly slag) beyond the transition zone and onto the section of the side wall of the vessel 3 that is above the transition zone 23.

In general terms, the slag layer 16 is a liquid continuous volume, with solid material and gas bubbles, and the transition zone 23 is a gas continuous volume with splashes, droplets, and streams of molten metal and slag. Alternatively, the slag layer 16 may be described as a slurry of solid material in a liquid phase with a dispersion of gas bubbles in the liquid phase.

The position of the oxygen-containing gas lance 7 and the gas flow rate through the lance 7 are selected so that the oxygen-containing gas penetrates the central region of the transition zone 23 and maintains an essentially metal/slag free space (not shown) around the end of the lance 7. The lance 7 includes an assembly which causes the oxygen-containing gas to be injected in a swirling motion into the vessel.

The injection of the oxygen-containing gas via the lance 7 post-combusts reaction gases CO and $H_2$ in the transition zone 23 and in the free space around the end of the lance 7 and generates high temperatures of the order of 2000° C. or higher in the gas space. The heat is transferred to the ascending and descending splashes droplets, and streams, of material from the metal layer and the heat is then partially transferred to the metal layer 15 when the material falls downwardly to the metal layer 15.

The described embodiment of the process of the invention includes controlling the process conditions so that the molten slag is within a selected composition range so that the slag is a molten slag, as described herein, in the operating temperature range of 1400-1550° C. of the process, with a high oxygen potential and a viscosity in a range of 1-5 poise when the slag temperature is in a range of 1400-1550° C. in the vessel 3.

The necessary control of process conditions can be achieved by one or more than one of a range of options, including but not limited to controlling the FeO content of the molten slag to achieve the required high oxygen potential and controlling the CaO content of the molten slag to achieve the required viscosity in the range of 1-5 poise when the slag temperature is in the range of 1400-1550° C. in the molten bath in the vessel 3.

More particularly, when titanomagnetite feed is used, the necessary control of process conditions include selecting the feed materials and operating conditions so that the molten slag has the following constituents in the stated range of 1400-1550° C. of the molten bath:

$TiO_2$: at least 15 wt. %,
$SiO_2$: at least 15 wt. %,
CaO: at least 15 wt. %,
$Al_2O_3$: at least 10 wt. %, and
FeO: at least 3 wt. %.

When normal iron ore is used, the $TiO_2$ percentage limitation in slag is to be disregarded.

More particularly, the necessary control of process conditions includes controlling the slag composition and the operating temperature so that the molten slag is sub-liquidus, preferably slightly sub-liquidus, for that slag composition in the stated range of 1400-1550° C. so that a solid oxide phase precipitates from the liquid slag in an amount of 5-25% by volume of the slag. The resultant molten slag is a slurry of a solid oxide phase in a liquid slag phase. The precipitated solid oxide phase contributes to controlling the viscosity of the molten slag as required for the described embodiment of the process. In addition, the viscous molten slag, is well-suited to form a protective coating on the refractories of the vessel in contact with the slag.

Figure 2:
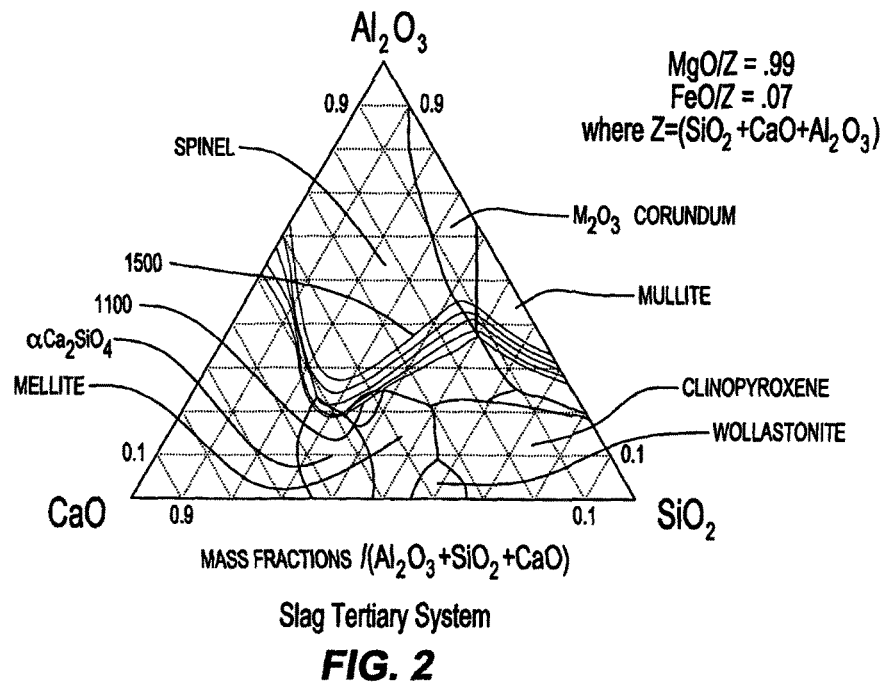
FIG. 2 is a tertiary phase diagram for calcia, alumina, and silica in slag in one embodiment of the direct smelting process of the present invention.

FIG. 2 is a tertiary phase diagram for three main slag constituents of calcia, alumina, and silica in one embodiment of the direct smelting process of the present invention. More particularly, the phase diagram focuses on two main gangue constituents of alumina and silica and a flux additive, namely calcia. The phase diagram was sourced from FactSage 6.1. The phase diagram illustrates the impact of the slag composition on the phases in the slag. In particular, it can be determined from FIG. 2 that if a higher viscosity slag (i.e. at least 2.5 poise) is required, this can be achieved by controlling the slag composition, for example by adjusting the calcia addition, and other process conditions to precipitate melilite solid phase from the molten slag.

Figure 3:
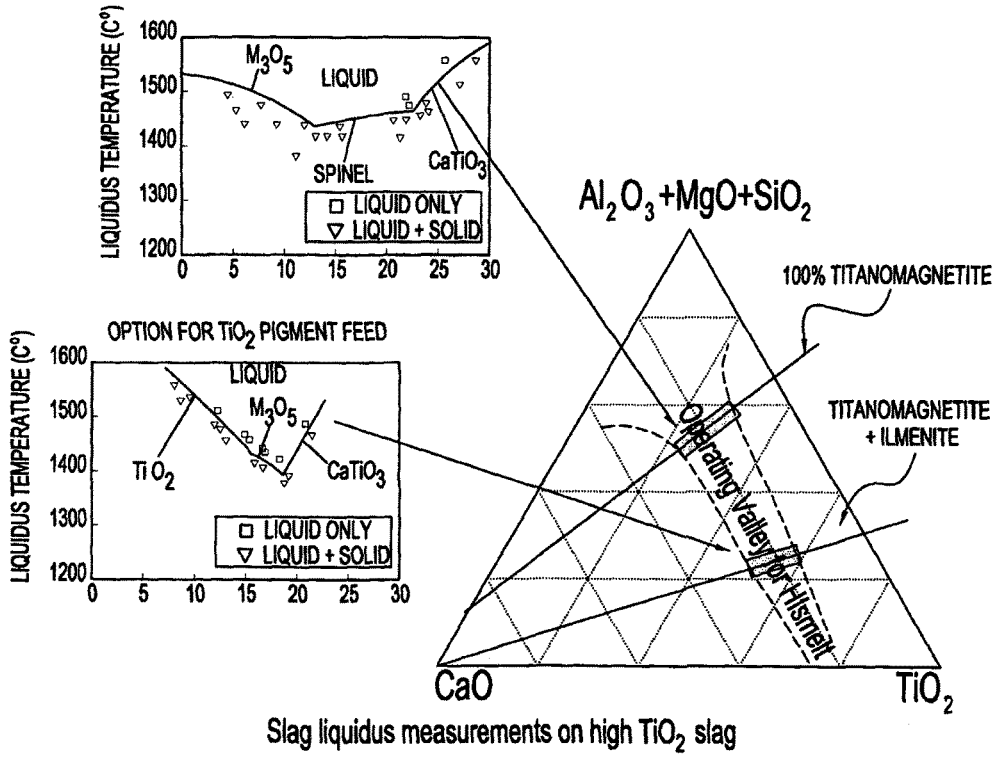
FIG. 3 is a pseudo-tertiary phase diagram for a slag and separate slag liquidus plots for two marked sections of the phase diagram for a high titanium oxide feed material in one embodiment of the direct smelting process of the present invention.

FIG. 3 is a pseudo-tertiary phase diagram for a slag and separate slag liquidus plots for two marked sections of the phase diagram for a high titanium oxide feed material in one embodiment of the direct smelting process of the present invention. The phase diagram focuses on (a) three main gangue constituents, namely alumina, magnesia, and silica, (b) a flux additive, namely calcia, and (c) titania. The phase diagram was sourced from University of Queensland researchers. The phase diagram defines an operating window for slag compositions that provide the required slag viscosities of 1-5 poise for the process. The Figure highlights two sections of the phase diagram and these sections show the significant change in liquidus temperatures across the selected compositions. It is particularly evident from these sections the considerable scope to precipitate out solid phases and thereby change the viscosity of the slag when the slag temperature is in the range of 1400-1550° C. in the molten bath in the vessel 3.

In more general terms, the following process features, separately or in combination, are relevant control parameters of the process.

(a) Controlling the slag inventory, i.e. the depth of the slag layer and/or the slag/metal ratio (typically the weight ratio of metal:slag to be between 3:1 and 1:1), to balance the positive effect of metal in the transition zone 23 on heat transfer with the negative effect of metal in the transition zone 23 on post combustion due to back reactions in the transition zone 23. If the slag inventory is too low the exposure of metal to oxygen is too high and there is reduced potential for post combustion. On the other hand, if the slag inventory is too high the lance 7 will be buried in the transition zone 23 and there will be reduced entrainment of gas into the free space 25 and reduced potential for post combustion.

(b) Selecting the position of the lance 7 and controlling injection rates of oxygen-containing gas and solids via the lance 7 and the lances 5 to maintain the essentially metal/slag free region around the end of the lance 7 and to form the transition zone 23 around the lower section of the lance 7.

(c) Controlling heat loss from the vessel by splashing with slag the sections of the side wall of the vessel 3 that are in contact with the transition zone 23 or are above the transition zone 23 by adjusting one or more of:
  (i) the slag inventory; and
  (ii) the injection flow rate through the lance 7 and the lances 5.

Many modifications may be made to the embodiment of the present invention described above without departing from the spirit and scope of the invention.

By way of example, whilst the above described embodiment relates to the Hismelt process, the present invention is not so limited and extends to any molten bath-based direct smelting process for producing molten metal from a metalliferous feed material in a direct smelting vessel that has a strong bath/slag fountain generated by gas evolution in the molten bath, with the gas evolution being at least partly the result of devolatilisation of carbonaceous material into the molten bath. For example, the Hisarna process is one other such process.

The invention claimed is:

1. A direct smelting process in a direct smelting vessel that includes;
   (a) injecting iron ore and a solid carbonaceous feed material into a molten bath comprising a layer of molten metal and a layer of molten slag, so as to deliver at least part of the iron ore and the solid carbonaceous feed materials into the metal layer and thereby direct smelting of the iron ore to molten iron, generating reaction gases from smelting reactions in the molten bath which cause molten metal and/or slag to be projected into a gas space above the surface of the molten bath and to form a transition zone,
   (b) injecting an oxygen-containing gas into the gas space to cause post-combustion of the reaction gases, whereby heat generated by post-combustion is transferred to the molten bath by heating the molten metal and the molten slag in the transition zone, and
   (c) producing process outputs of molten iron, molten slag, and an off-gas, and the process being characterised by:
   (i) controlling the slag composition with respect to an FeO content and additive content and the temperature of the molten bath to be below the liquidus temperature of the slag so that a solid oxide phase precipitates from a liquid phase of the molten slag, whereby the slag is a slurry of a solid material and a liquid phase, the solid material is at least 5 vol. % and less than 30 vol. % of the molten slag, and the molten slag has a viscosity in a range of 0.5-5 poise in an operating temperature range for the process; and
   (ii) controlling the injection of the solid carbonaceous feed materials and a carrier gas, to produce substantial agitation of the molten bath such that there is a substantial uniform temperature in the molten bath; and
   (iii) controlling the injection rate of the iron ore feed material and the solid carbonaceous feed material so that a FeO content of the molten slag is at least 3 wt. % and less than 10 wt. %.

2. The process defined in claim 1 includes controlling the process conditions so that the solid material in the molten slag is at least 10 vol. % and less than 30 vol. % of the molten slag.

3. The process defined in claim 1 includes controlling the process conditions so that the solid material in the molten slag is 15-25 vol. % of the molten slag.

4. The process defined in claim 1 includes controlling the process conditions so that the molten slag has a viscosity in a range of 0.5-5 poise when the slag temperature is in a range of 1400-1550° C. in the direct smelting vessel.

5. The process defined in claim 1 includes controlling the process conditions by controlling the ratio of the concentrations of iron in the slag to carbon in the metal to be less than 2:1.

6. The process defined in claim 1 includes controlling the process conditions so that the molten slag has a high oxygen potential compared to blast furnace slag.

7. The process defined in claim 1 includes controlling the process conditions so that the FeO content of the molten slag is at least 4 wt. %.

8. The process defined in claim 1 includes controlling the process conditions so that the FeO content of the molten slag is at least 5 wt. %.

9. The process defined in claim 1 includes controlling the process conditions so that the carbon content of the molten slag is at least 3 wt. %.

10. The process defined in claim 9 includes controlling the process conditions so that the carbon content of the molten slag is at least 4 wt. %.

11. The process defined in claim 1 includes controlling the process conditions so that the viscosity of the molten slag is in the range of 0.5-4 poise.

12. The process defined in claim 11 includes controlling the process conditions so that the viscosity of the molten slag is in the range of 0.5-3 poise.

13. The process defined in claim 11 includes controlling the process conditions so that the viscosity of the molten slag is greater than 2.5 poise.

14. The process defined in claim 1 wherein controlling the process condition includes:
   (i) operating conditions within the direct smelting vessel, including temperature and pressure and injection rates of the solid carbonaceous feed materials and the oxygen-containing gas into the vessel;
   (ii) the composition of the molten bath, including the slag composition; and
   (iii) the characteristics of the molten bath.

* * * * *